US007535534B2

United States Patent
(12) United States Patent
Lee et al.

(10) Patent No.: US 7,535,534 B2

(45) Date of Patent: May 19, 2009

(54) FFS MODE LIQUID CRYSTAL DISPLAY

(75) Inventors: Kyung Ha Lee, Kyoungki-do (KR); Hyang Yul Kim, Kyoungki-do (KR); Jong Yob Jeon, Kyoungki-do (KR); Chi Wook An, Kyoungki-do (KR)

(73) Assignee: Hydis Technologies Co., Ltd., Gyeonggi-do (KR)

(*) Notice: Subject to any disclaimer, the term of this patent is extended or adjusted under 35 U.S.C. 154(b) by 54 days.

(21) Appl. No.: 11/853,125

(22) Filed: Sep. 11, 2007

(65) Prior Publication Data

US 2007/0296902 A1 Dec. 27, 2007

Related U.S. Application Data

(63) Continuation of application No. 10/883,422, filed on Jun. 30, 2004, now abandoned.

(30) Foreign Application Priority Data

Aug. 26, 2003 (KR) ...................... 10-2003-0059242

(51) Int. Cl.
*G02F 1/1343* (2006.01)

(52) U.S. Cl. ....................... 349/141; 349/144; 349/145; 349/146; 349/129

(58) Field of Classification Search ......... 349/144–146, 349/129, 141
See application file for complete search history.

(56) References Cited

U.S. PATENT DOCUMENTS 6,459,465 B1 * 10/2002 Lee ............................ 349/141
6,704,068 B2 * 3/2004 Murade ........................ 349/44
2002/0041354 A1 * 4/2002 Noh et al. ................... 349/141

FOREIGN PATENT DOCUMENTS

JP 2000-356789 A 12/2000
WO 01/18597 A1 3/2001

* cited by examiner

*Primary Examiner*—David Nelms
*Assistant Examiner*—Phu Vu
(74) *Attorney, Agent, or Firm*—Ladas & Parry LLP

(57) ABSTRACT

An FFS (Fringe Field Switching) mode liquid crystal display comprises a lower substrate and an upper substrate and a gate line formed on the lower substrate. A data line crosses perpendicular to the gate line. A first ITO electrode is formed in a region defined by the gate line and the data line. A second ITO electrode of a comb-teeth pattern is formed on the lower substrate while being overlapped on the first ITO electrode. A black matrix formed on the upper substrate, wherein, a wedge portion of the second ITO electrode is formed at a position spaced by a predetermined interval to the inside from an edge section of the black matrix.

10 Claims, 5 Drawing Sheets

W
40
41
b
B
39a
35
39
37
30
C1
C
C2

FFS MODE LIQUID CRYSTAL DISPLAY

RELATED APPLICATIONS

This application is a continuation of U.S. patent application Ser. No. 10/883,422, which was filed on Jun. 30, 2004, and which is now abandoned.

BACKGROUND OF THE INVENTION

1. Field of the Invention

The present invention relates to a fringe field switching (hereinafter, simply referred to as "FFS") mode liquid crystal display, and more particularly to an FFS mode liquid crystal display capable of improving driving mura and luminance non-uniformity.

2. Description of the Prior Art

A method for fabricating an ultra-FFS mode liquid crystal display may be described as follows, with reference to FIGS. 1A and 1B. Herein, FIG. 1A is a plan view of a conventional ultra-FFS mode liquid crystal display, and FIG. 1B is a sectional view thereof.

As shown in FIG. 1A, according to the conventional ultra-FFS mode liquid crystal display, a gate line 11 and a data line 15 are aligned to cross perpendicular to each other on a lower substrate 10. Then, a first ITO electrode 17 is aligned in a region defined by the gate line 11 and the data line 15 and a second ITO electrode 19 for a pixel electrode is aligned while overlapping with the first ITO electrode 17. The orientation of liquid crystal is aligned at 0 degrees. Herein, the second ITO electrode 19 for the pixel electrode includes a plurality of slit patterns 19*a*, in which the slit patterns 19*a* are formed in an inclined manner, so that the edge sections of the slit patterns 19*a* have a wedge shape.

Also, as shown in FIG. 1B, an upper substrate 20 is disposed opposite to the lower substrate 10, while being spaced from the lower substrate 10 by a predetermined interval, and a black matrix 21 is formed on the upper substrate 20. Herein, the edge sections of the slit patterns 19*a* having the wedge shape in the second ITO electrode 19 for the pixel electrode, which overlaps with the black matrix 21, are disposed in a transmission region spaced by a length of 'a' to the outside from an edge section of the black matrix 21. That is, the slit patterns 19*a* of the second ITO electrode 19 are disposed while not overlapping with the black matrix 21.

Owing to such a construction, when liquid crystal molecules are twisted by an electric field, upper liquid crystal molecules (a color filter substrate) and lower liquid crystal molecules (an array substrate) are twisted in opposite directions from each other, thereby compensating for chromatic shift toward a bluish color or a yellowish color, which is caused by dielectric anisotropy of the liquid crystal.

According to the conventional FFS mode liquid crystal display fabricated the above-mentioned method, since an overlapped region between electrodes is very wide, layers such as an insulation layer may be deteriorated due to long-period electrical operations, which results in inferior afterimages.

In order to correct such a disadvantage, various shapes and structures of electrodes have been studied and proposed.

However, according to conventional FFS pixels, the edge sections of the slit patterns having the wedge shape, which forms a non-uniform electric field (i.e. which causes distortion in the operation of liquid crystal) are not disposed in the black matrix but located in the actual transmission region.

As a result, such a relationship between the pixel wedge and the black matrix causes transmittance reduction and luminance non-uniformity due to an alternation operation between them, so that the characteristics of manufactured goods are deteriorated.

SUMMARY OF THE INVENTION

Accordingly, the present invention has been made to solve the above-mentioned problems occurring in the prior art, and an object of the present invention is to provide an FFS (Fringe Field Switching) mode liquid crystal display which can improve operating mura, luminance non-uniformity, etc., which have been problematic in the conventional FFS mode liquid crystal display, by establishing a new conception of mutual factors between a black matrix and a pixel electrode provided in an FFS design structure.

In order to accomplish this object, there is provided an FFS (Fringe Field Switching) mode liquid crystal display comprising: a lower substrate and an upper substrate; a gate line formed on the lower substrate; a data line crossing perpendicular to the gate line; a first ITO electrode formed in a region defined by the gate line and the data line; a second ITO electrode being formed on the lower substrate while overlapping with the first ITO electrode, and including a plurality of slit patterns having edge sections of a wedge shape; and a black matrix formed on the upper substrate, wherein the second ITO electrode is disposed such that the edge sections of the slit patterns having the wedge shape overlap with the black matrix.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1A:
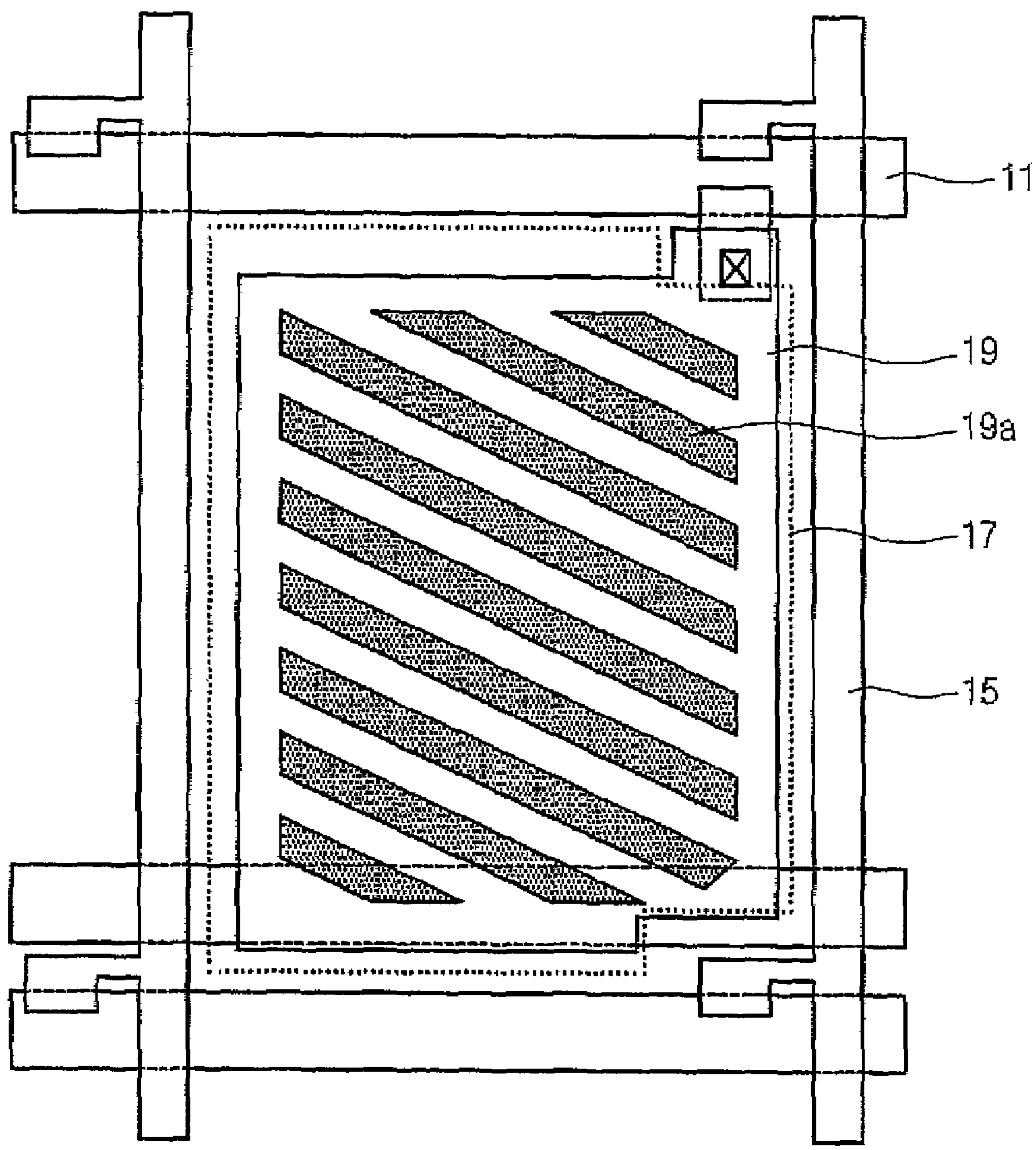
FIG. 1A is a plan view of a conventional ultra-FFS mode liquid crystal display.
Figure 1B:
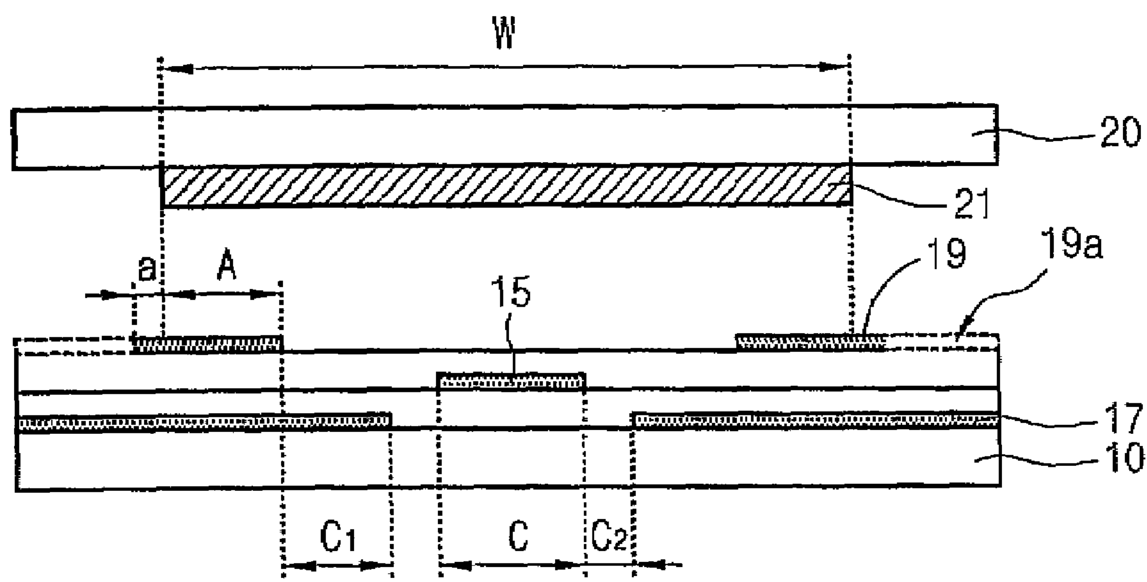
FIG. 1B is a sectional view thereof.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 2A:
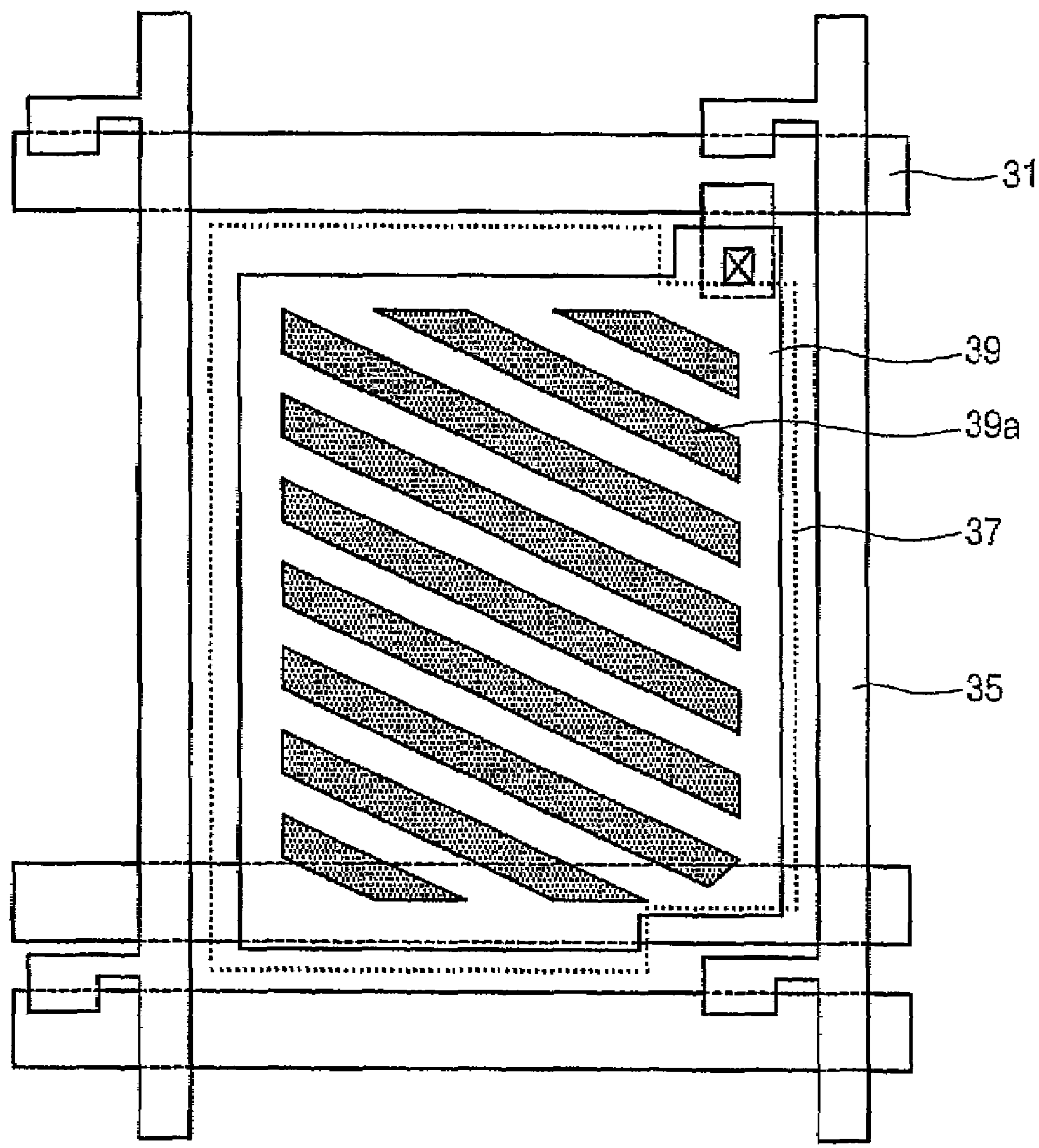
FIG. 2A is a layout view of an FFS mode liquid crystal display according to one embodiment of the present invention.
Figure 2B:
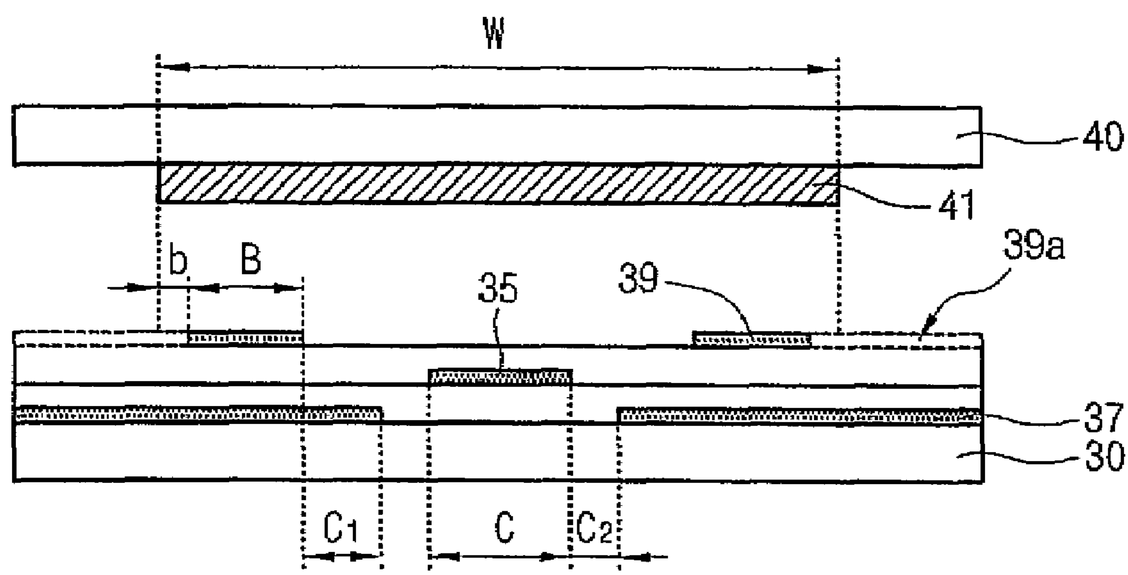
FIG. 2B is a sectional view of the FFS mode liquid crystal display shown in FIG. 2A.

FIG. 2A is a layout view of an FFS (Fringe Field Switching) mode liquid crystal display according to one embodiment of the present invention, and FIG. 2B is a sectional view of the FFS mode liquid crystal display according to this embodiment of the present invention.

Figure 3:
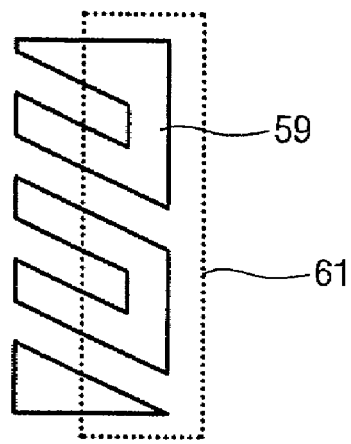
FIGS. 3 and 4 are schematic views for explaining the shapes of edge sections of slit patterns in FFS mode liquid crystal displays according to other embodiments of the present invention.
Figure 4:
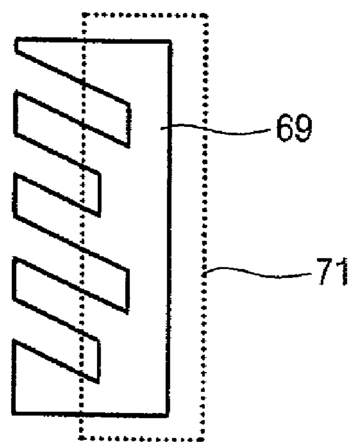

FIGS. 3 and 4 are schematic views for explaining FFS mode liquid crystal displays according to other embodiments of the present invention, in which a wedge portion of a second ITO electrode is formed with removed parts spaced from each other, so as to improve distortion of liquid crystal.

As shown in FIG. 2A according to an FFS mode liquid crystal display of one embodiment of the present invention, a gate line 31 and a data line 35 are aligned to cross perpendicular to each other on a lower substrate 30. A first ITO electrode 37 is aligned in a region defined by the gate line 31 and the data line 35 and. A second ITO electrode 39 for a pixel electrode is aligned while overlapping with the first ITO electrode 37. The orientation of liquid crystal is aligned at 0°. Herein, the second ITO electrode 39 for the pixel electrode includes a plurality of slit patterns 39*a*, in which the slit patterns 39*a* are formed in an inclined manner, so that the edge sections of the slit patterns 39*a* have a wedge shape.

In addition, as shown in FIG. 2B, an upper substrate 40 is disposed opposite to the lower substrate 30, while being spaced from the lower substrate 30 by a predetermined interval, and a black matrix 41 is formed on the upper substrate 40. The black matrix 41 is formed using conductive material which has a resistance of $1\times10^{-2}$ Ωcm to $1\times10^{-7}$ Ωcm. Also, the black matrix 41 is formed to have a width of 22 μm or less.

Herein, different from the conventional construction, the second ITO electrode 39 for a pixel electrode located on the lower substrate 30 according to the present invention is formed with the slit patterns 39*a* extended by a length of 'b', for example, by 0.5 μm or more, to the inside from an edge section of the black matrix 41. In other words, the slit patterns 39*a* having the wedge shape are disposed in such a manner that the edge sections of the slit patterns 39*a* overlap with the black matrix 41 by a width of 0.5 μm or more. Therefore, according to the FFS mode liquid crystal display of the present invention, it is possible to prevent afterimage or mura due to distortion of liquid crystal, which occurs around the edge sections of the slit patterns 39*a*, from being displayed on the screen.

Meanwhile, according to other embodiments of the present invention, the shape of the slit pattern in the second ITO electrode for a pixel electrode may be modified as shown in FIGS. 3 and 4, so that the distortion of liquid crystal can be minimized. FIG. 3 shows a second ITO electrode 59 including slit patterns 59*a* which are alternatively and oppositely opened on one side, so that the second ITO electrode 59 has a serpentine shape. FIG. 4 is a second ITO electrode 69, in which slit patterns 69*a* having different lengths are alternately disposed. Herein, the edge sections of all the slit patterns 59*a* and 69*a* shown in FIGS. 3 and 4 are disposed while overlapping with black matrixes 61 and 71.

As described above, according to the FFS mode liquid crystal display of the present invention, the edge sections of the slit pattern having a wedge shape in the second ITO electrode are disposed while overlapping with the conductive black matrix, so that it is possible to prevent distortion of liquid crystal occurring around the edge sections of the slit pattern (i.e. distortion of liquid crystal occurring due to electric field interference between the conductive black matrix and the edge sections of the slit pattern having the wedge shape) from being displayed on the screen. Accordingly, mura (i.e. block, Y-block, and luminance non-uniformity) and afterimages (i.e. un stability of liquid crystal due to an unstable operation) can be improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An FFS (Fringe Field Switching) mode liquid crystal display comprising:

a lower substrate including a gate line and a data line crossing perpendicular to the gate line;

a first ITO electrode formed in a region defined by the gate line and the data line, the first ITO electrode being a plate-type electrode; and a second ITO electrode formed on the lower substrate while overlapping with the first ITO electrode, the second ITO electrode including a plurality of slit patterns having edge sections of a wedge shape, the edge sections of the slit pattern extending toward the data line; and an upper substrate including a conductive black matrix formed on the upper substrate, the resistance of the conductive black matrix having a resistance of $1\times10^{-2}$ Ω-cm to $1\times10^{-7}$ Ω-cm, wherein edge sections of the slit patterns extending toward the data line are formed at a position spaced by a predetermined interval to the inside from an edge section of the black matrix, which is disposed above the data line, said conductive black matrix being sized, shaped and arranged to prevent distortion of the liquid crystal occurring due to electric field interference, near the data line, between the conductive matrix and edge sections of the slit pattern having the wedge shape.

2. The FFS mode liquid crystal display as claimed in claim 1, wherein the edge section of the slit pattern in the second ITO electrode overlaps by 0.5 μm or more to an inside with an edge section of the black matrix.

3. The FFS mode liquid crystal display as claimed in claim 1, wherein the second ITO electrode includes slit patterns, which are alternatively and oppositely opened on one side.

4. The FFS mode liquid crystal display as claimed in claim 1, wherein the second ITO electrode includes slit patterns of different lengths, which are alternatively aligned.

5. The FFS mode liquid crystal display as claimed in claim 1, wherein the black matrix has a width of 22 μm or less.

6. An FFS (Fringe Field Switching) mode liquid crystal display comprising:

a lower substrate including a gate line and a data line crossing substantially perpendicular to the gate line;

an upper substrate;

a first electrode formed in a region defined by the gate line and the data line;

a second electrode formed on the lower substrate while overlapping with the first electrode, the second electrode including a plurality of slit patterns having edge sections, the edge sections of the slit patterns extending toward the data line; and a conductive black matrix selectively formed on the upper substrate, the resistance of the conductive black matrix being $1\times10^{-2}$ Ω-cm to $1\times10^{-7}$ Ω-cm wherein the edge sections of the slit patterns extending toward the data line are formed at a position spaced by a predetermined interval to the inside from an edge section of the black matrix, which is disposed above the data line, said conductive black matrix being sized, shaped and arranged to prevent distortion of the liquid crystal occurring due to electric field interference, near the data line, between the conductive matrix and edge sections of the slit pattern having the wedge shape.

7. The FFS mode liquid crystal display as claimed 6, wherein the edge section of the slit pattern in the second electrode overlaps by 0.5 μm or more, to an inside with an edge section of the black matrix.

8. The FFS mode liquid crystal display as claimed 7, wherein the second electrode includes slit patterns, which are alternatively and oppositely opened on one side.

9. The FFS mode liquid crystal display as claimed 7, wherein the black matrix has a width of 22 μm or less.

10. The FFS mode liquid crystal display as claimed 7, the first electrode is a plate-type electrode.

* * * * *